United States Patent
Oliana

(10) Patent No.: US 12,532,919 B2
(45) Date of Patent: Jan. 27, 2026

(54) ELECTRICALLY OPERATED AEROSOL-GENERATING DEVICE WITH MEANS FOR DETECTING AN AIRFLOW IN THE DEVICE

(71) Applicant: Philip Morris Products S.A., Neuchatel (CH)

(72) Inventor: Valerio Oliana, Pully (CH)

(73) Assignee: Philip Morris Products S.A., Neuchatel (CH)

(*) Notice: Subject to any disclaimer, the term of this patent is extended or adjusted under 35 U.S.C. 154(b) by 434 days.

(21) Appl. No.: 17/760,118

(22) PCT Filed: Feb. 4, 2021

(86) PCT No.: PCT/EP2021/052664
§ 371 (c)(1),
(2) Date: Aug. 4, 2022

(87) PCT Pub. No.: WO2021/156365
PCT Pub. Date: Aug. 12, 2021

(65) Prior Publication Data
US 2023/0038544 A1    Feb. 9, 2023

(30) Foreign Application Priority Data
Feb. 6, 2020  (EP) .................................. 20155847

(51) Int. Cl.
*A24F 40/51*   (2020.01)
*A24F 40/40*   (2020.01)

(52) U.S. Cl.
CPC .............. *A24F 40/51* (2020.01); *A24F 40/40* (2020.01)

(58) Field of Classification Search
None
See application file for complete search history.

(56) References Cited

U.S. PATENT DOCUMENTS 10,349,674 B2   7/2019  Sur
11,935,350 B2 * 3/2024  Hubbard ............... H02J 7/0042
(Continued)

FOREIGN PATENT DOCUMENTS

CA    3 100 749 A1    12/2019
CN    205456062 U     8/2016
(Continued)

OTHER PUBLICATIONS

Russian Office Action and Search Report dated Jun. 4, 2024 in corresponding Russian Patent Application No. 2022123595/03 (with English Translation of Category of Cited Documents). 12 pages.
(Continued)

Primary Examiner — Philip Y Louie
Assistant Examiner — Jeffrey A. Buckman
(74) Attorney, Agent, or Firm — Oblon, McClelland, Maier & Neustadt, L.L.P.

(57) ABSTRACT

An electrically operated aerosol-generating device for generating an aerosol, the device including: a receiving cavity configured to removably receive an aerosol-forming substrate or at least a portion of an aerosol-generating article comprising an aerosol-forming substrate; an air path, which extends through the device and is configured to support an airflow in the device; a sound-generating member, which is arranged in fluid communication with the air path and is configured to generate sound caused by an airflow passing the sound-generating member when a user takes a puff, and is disposed in a distal end portion of the receiving cavity; and a puff detector including a vibration sensor fluidly separated from the air path and configured to detect sound propagating from the sound-generating member to the vibration sensor.

16 Claims, 3 Drawing Sheets

(56) References Cited

U.S. PATENT DOCUMENTS

| | | | | |
|---|---|---|---|---|
| 2015/0053217 A1* | 2/2015 | Steingraber | ............. | A24F 40/50 |
| | | | | 131/329 |
| 2015/0090277 A1* | 4/2015 | Xiang | ................... | A24F 40/50 |
| | | | | 131/328 |
| 2015/0238713 A1 | 8/2015 | Cohen et al. | | |
| 2016/0128389 A1 | 5/2016 | Lamb et al. | | |
| 2019/0335817 A1* | 11/2019 | Freeman | ................ | G01N 21/85 |

FOREIGN PATENT DOCUMENTS

| | | |
|---|---|---|
| CN | 206333370 U | 7/2017 |
| CN | 107865463 A | 4/2018 |
| EP | 3 075 266 A1 | 10/2016 |
| EP | 3 422 879 A0 | 1/2019 |
| EP | 33136 B1 | 8/2019 |
| KR | 10-2055749 B1 | 12/2019 |
| RU | 2 693 705 C2 | 7/2019 |
| RU | 2 710 771 C2 | 1/2020 |
| WO | WO 2013/102609 A2 | 7/2013 |
| WO | WO 2015/042848 A1 | 4/2015 |
| WO | WO 2015/109618 A1 | 7/2015 |
| WO | WO 2018/050735 A1 | 3/2018 |
| WO | WO 2018/054064 A1 | 3/2018 |
| WO | WO 2020/216765 A1 | 10/2020 |

OTHER PUBLICATIONS

International Search Report and Written Opinion issued Apr. 19, 2021, in PCT/EP2021/052664 filed Feb. 4, 2021, 15 pages.

Office Action issued Oct. 28, 2025 in Indian Patent Application No. 202217050320, with concise English translation.

Office Action issued Oct. 17, 2025 in Chinese Patent Application No. 202180012933.0, with concise English translation.

Office Action issued Nov. 10, 2025 in Malaysian Patent Application No. PI2022004134.

* cited by examiner

ELECTRICALLY OPERATED AEROSOL-GENERATING DEVICE WITH MEANS FOR DETECTING AN AIRFLOW IN THE DEVICE

The present invention relates to an electrically operated aerosol-generating device for generating an aerosol, in particular for generating an aerosol by releasing a substance of an aerosol-forming substrate into an airflow, wherein the device comprises means for detecting an airflow in the device. The invention further relates to an aerosol-generating system comprising such a device and an aerosol-generating article comprising the aerosol-forming substrate.

Electrically operated aerosol-generating devices used for generating inhalable aerosols by releasing a substance of an aerosol-forming substrate into an airflow are generally known from the prior art. For example, such devices may comprise an electrical heater for heating an aerosol-forming substrate which is capable of releasing volatile compounds forming an inhalable aerosol when heated. As another example, such devices may comprise an atomizer for dispersing particles or droplets of an aerosol-forming substrate into an airflow such as to form an inhalable aerosol.

To keep a user's experience as uniform as possible, the substance release from the aerosol-forming substrate has to be maintained at a certain level when a user takes a puff. However, the substance release may vary during consumption, in particular due to the airflow that is drawn through the system during the user's puff. For this reason, proper puff detection is important for an accurate control of the substance release. Puff detection may be realized, for example, by measuring a pressure drop in the airflow through the device when a user takes a puff. For this, many devices comprise a pressure sensor in direct fluid communication with the air path through the device for directly detecting an airflow indicative of a user taking a puff. However, in such an arrangement the sensor is directly exposed to the conditions in the air path, for example, to heat and moisture effects originating from the aerosol formation. Due to this, proper airflow detection may be adversely affected, possibly resulting in faulty or even non-functional puff detection.

Therefore, it would be desirable to provide an electrically operated aerosol-generating device comprising means for puff detection using the advantages of prior art solutions, whilst mitigating their limitations. In particular, it would be desirable to have an electrically operated aerosol-generating device comprising improved means for detecting an airflow through the device that is indicative of a user's puff.

According to the present invention there is provided an electrically operated aerosol-generating device for generating an aerosol, in particular an electrically operated aerosol-generating device for generating an aerosol by releasing a substance of an aerosol-forming substrate into an airflow. The device comprises an air path which extends through the device and is configured to support an airflow in the device. The device further comprises a sound generating member which is arranged in fluid communication with the air path and configured to generate sound caused by an airflow passing the sound generating member in use of the device when a user takes a puff. In addition, the device comprises a puff detector comprising a vibration sensor. The vibration sensor is fluidly separated—at least within the device—from the air path and configured to detect the sound propagating from the sound generating member to the vibration sensor. Accordingly detection of the sound propagating from the sound generating member to the vibration sensor may allow to detect an airflow through the device being indicative of a user's puff.

According to the invention it has been recognized that the airflow, in particular changes in the airflow, being indicative of a user taking a puff may be reliably detected by using the airflow to generate air vibrations (sound) or vibrations of at least a portion of the device which propagate and thus may be remotely detected by a vibration sensor. Due to the remote detectability of the propagating vibrations, the vibration sensor may be arranged fluidly separated from the air path in the device. Advantageously, the fluidly separated arrangement of the vibration sensor makes the airflow and puff detection less prone to errors and thus more reliable. Furthermore, it has been recognized that usage of a sound generating member may act as an amplifier of the airflow through the air path in that it generates vibrations which are transmitted to the remote vibration sensor.

As used in, the term "sound" or "propagating vibrations" basically refers to a mechanical, acoustic wave propagating through a gaseous, fluid or solid medium, in particular air or structural components (solid matter) of the aerosol-generating device. The term "acoustic wave" refers to a type of energy propagation by means of adiabatic compression and decompression of the medium (air or solid matter of the device, respectively).

The terms "acoustic waves" or "sound" may relate to acoustic waves or sound perceptible/audible by a human being by its auditory perception, in particular by hearing. Frequencies capable of being heard by humans are typically within a range between 20 Hertz (Hz) and 20.000 Hertz (Hz). Likewise, the terms "acoustic waves" or "sound" may relate to acoustic waves or sound in a frequency range beyond the frequency spectrum audible by a human being, in particular in a frequency range above 20.000 Hertz (Hz) or in a frequency range below 20 Hertz (Hz). Accordingly, the terms "acoustic waves" or "sound" may also relate to ultrasonic waves or sound, or to infrasonic waves or sound.

In general, the sound generating member may be any mechanical member suitable to generate sound by an airflow passing the vibrating generating member. To this extent, the sound generating member may also be denoted as airflow-driven sound generating member.

For generating sound, the sound generating member may comprise a sound generating displacement structure which is configured to partially displace the airflow when passing the sound generating displacement structure. Like in displacement aero-phones, such as pipes, whistles and flutes, an airflow passing the sound generating displacement structure is divided and modified by the displacement structure such that vibrations in the airflow, that is, adiabatic compressions and decompressions of the airflow, are generated. Typically, the sound generating displacement structure may comprise one or more edges, in particular, sharp edges which the airflow meets when passing the sound generating displacement structure.

Preferably, the sound generating displacement structure comprises at least one of: one or more grooves or one or more ridges, one or more dimples, or one or more protrusions. When air passes along the one or more grooves, dimples, protrusions or ridges, respectively, a laminar airflow getting contact with the one or more grooves, dimples, protrusions or ridges is transformed into turbulent airflow due to collisions with the one or more grooves or ridges, respectively. Accordingly, part of the kinetic energy of the airflow, that is, the dynamic pressure is transformed into a static pressure. If the sound generating displacement structure comprises a plurality of grooves or ridges, respectively, the partial displacement of the airflow creates a plurality of alternating high and low pressure regions in the airflow which giving rise to vibrations in the airflow, that is, sound.

In general, the frequency and the amplitude of the sound depend to the shape, the height or depth and the periodicity of the grooves, dimples, protrusions or ridges, respectively. In addition, the frequency and the amplitude of the sound depend on the velocity of the airflow passing along the vibrating generating displacement structure. Accordingly, the shape, the height or the depth of the grooves, dimples, protrusions or ridges and—in case of a plurality of grooves, dimples, protrusions or ridges—the periodicity of the grooves, dimples, protrusions or ridges may be designed such as to selectively generate vibrations having a specific frequency (frequency spectrum) and amplitude.

The one or more grooves, or the one or more ridges, or the one or more grooves and the one or more ridges may have any kind of shape suitable to partially displace airflow. Preferably, the one or more grooves, or the one or more ridges, or the one or more grooves and the one or more ridges may comprise one of: a triangular shape, a curved, in particular sinusoid shape, or a rectangular shape. As used in, the shape of the one or more grooves or ridges, respectively, refers to the cross-sectional shape of the one or more grooves or ridges as seen in a cross-section perpendicular to a length extension of the one or more grooves or ridges, respectively.

In general, the plurality of grooves or ridges may be evenly or unevenly distributed along the sound generating displacement structure. Preferably, the sound generating displacement structure comprises a periodic pattern. That is, the grooves or the ridges or both, the grooves and ridges are arranged in a periodic pattern having a constant distance between each pair of adjacent grooves or ridges, respectively. A periodic pattern proves advantageous with regard to the generation of vibrations having a specific, in particular narrow banded frequency spectrum.

Depending on the frequency of the sound to be generated, the periodic pattern may have a periodicity in a range between 0.5 ridges or grooves per millimeter and 10 ridges or grooves per millimeter, in particular between 1 ridges or grooves per millimeter and 5 ridges or grooves per millimeter, preferably between 2 ridges or grooves per millimeter and 4 ridges or grooves per millimeter. That is, the periodic pattern may have a period length in a range between 0.1 millimeter and 2 millimeter, in particular between 0.2 millimeter and 1 millimeter, preferably between 0.25 millimeter and 0.5 millimeter. Accordingly, the generating displacement structure may comprise a plurality of ridges or grooves, or both, a plurality of ridges and grooves, having a distance between each pair of adjacent grooves or ridges in a range between 0.1 millimeter and 2 millimeter, in particular between 0.2 millimeter and 1 millimeter, preferably between 0.25 millimeter and 0.5 millimeter.

For example, if the periodic pattern of the sound generating displacement structure has a period length of 0.25 mm and the velocity of the airflow passing the sound generating displacement structure is 10 meters per second, sound having a frequency of about 40 kilo-Hertz (kHz) may be generated.

The periodic pattern may be a linear periodic pattern. The periodic pattern may be a one-dimensional, such as an array of a plurality of parallel grooves or ridges. That is, the pattern comprises a periodicity along one direction only. The periodic pattern may be a multi-dimensional, in particular two-dimensional pattern. That is, the pattern comprises periodicities along more than one direction, in particular two directions. For example, the pattern may comprise a first periodicity along a first direction and a second periodicity along a second direction. The first direction and the second direction may be transverse, in particular perpendicular to each other. As an example, the periodic pattern may comprise a first array of a plurality of parallel first grooves or first ridges having a first periodicity along a first direction, and a second array of a plurality of parallel second grooves or second ridges having a second periodicity along a second direction. In particular, such a periodic pattern may be a crisscross pattern or a grid pattern.

The periodic pattern may be a non-linear periodic pattern. For example, the periodic pattern may comprise a plurality of curved, in particular ring-shaped grooves or curved, in particular ring-shaped ridges. The periodic pattern may comprise a concentric ring pattern formed a plurality of ring-shaped grooves or a plurality of ring-shaped ridges. The ring pattern or ring shape may be circular, elliptical, oval, rectangular, quadratic, or polygonal. Symmetry-wise, a periodic ring pattern may prove advantageous with regard to an arrangement of the sound generating displacement structure at a distal end surface of a cylindrical receiving cavity.

As another example, the periodic pattern may comprise spiral pattern formed be spiral-shaped groove or ridge.

As another example, the periodic pattern may comprise honeycomb pattern comprising a plurality of grooves or ridges forming the contour of honeycomb pattern.

To enhance sound generation, a length extension of at least of the one or more grooves or the one or more ridge may be transverse, in particular perpendicular to a direction of the airflow passing the sound generating member in use of the device.

At least one of a height of the ridges or a depth of the grooves varies, may be constant along the sound generating displacement structure in a direction of the airflow passing the sound generating member in use of the device. Alternatively, at least one of a height of the ridges or a depth of the grooves varies, may vary, in particular increases along the sound generating displacement structure in a direction of the airflow passing the sound generating member in use of the device. This may allow for adapting the sound generation to the geometry and dimensions of the air path, for example, in order to provide a specific resistance to draw (RTD).

Preferably, the sound generating member, in particular the sound generating displacement structure is part of a wall member defining at least a portion of the air path through the device. Advantageously, this may simplify the manufacturing and assembly of the device. In particular, having the sound generating displacement structure integral with a wall member of the device allows for a compact design of the device. For example, the sound generating displacement structure may comprise one or more grooves, or one or more ridges, or one or more grooves and one or more ridges formed in a wall member of the device which defines at least a portion of the air path through the device.

Likewise, the sound generating member, in particular the sound generating displacement structure may be a separate member or element, separate from, in particular attached to a wall member defining at least a portion of the air path through the device.

The sound generating displacement structure preferably is a rigid structure. As such, neither the sound generating displacement structure as a whole nor any structural components of the sound generating displacement structure experience a center-of-mass deflection. However, this does not exclude that sound may propagate through the sound generating displacement structure.

Alternatively or in addition to a sound generating displacement structure, the sound generating member may comprise at least one airflow-driven vibration element for periodically interrupting the airflow passing the vibration element. Like in interruptive aero-phones, in particular in reed aero-phones, such as oboes or clarinets, an airflow is directed against a flexible vibration element, such as a lamella or pair of lamellae, causing the vibration element to vibrate.

Due to the airflow-driven vibrations of the flexible vibration element, the airflow passing the vibrating element is periodically interrupted which causes the air to be set in motion, thereby producing sound.

Accordingly, the at least one vibration element may comprise a lamella or a reed or a pair of reeds or a pair of lamellae.

Likewise, the at least one vibration element may comprise a restricted movable element for periodically interrupting the airflow passing the vibration element. For restricting its free movement, the movable element may be arranged in a cage, like a pea in a pea-whistle. Likewise, the movable element may be restricted by coupling the movable element to a one end of a spring element, wherein the other end of the spring element is fixedly attached in the device.

Of course, it is possible that the sound generating member comprises a plurality of vibration elements, for example a plurality of a lamellae or reeds. Having a plurality of vibration elements advantageously enhances the amplitude of the generated sound which in turn promotes sound propagation towards the vibration sensor.

As mentioned above, the amplitude and the frequency/frequency spectrum of the generated sound may be affected by the dimensions and configuration of the air path and the sound generating member. In order to make the generated sound non-perceptible by the user of the device, in particular in order to avoid undesired noise exposure, the generated sound preferably is outside the frequency spectrum audible by a human being, even more preferably outside the frequency spectrum audible by many animals, in particular pets, such as dogs or cats. Accordingly, the air path and the sound generating member may be configured such that the sound generated in use of the device is in a frequency range above 15 kilo-Hertz (kHz), preferably above 20 kilo-Hertz (kHz), more preferably above kilo-Hertz (kHz).

In order to have the vibration senor fluidly separated—at least within the device—from the air path through the device, the vibration sensor may be arranged in a compartment of the device which is fluidly separated—at least within the device—from the air path through the device. Due to this, the vibration senor is not in direct fluid communication with air path, in particular not in direct contact with any fluids (air, aerosol, aerosol particles) passing through the air path. This does not exclude that the vibration senor is in indirect fluid communication with air path through the device, for example, via a direct fluid communication to ambient air surrounding the device which in turn may be in direct fluid communication with the air path through the device, for example via an air inlet or an air outlet of the device. In this configuration, the vibration senor is still sufficiently insulated from any fluids (air, aerosol, aerosol particles) passing through the air path.

Accordingly, the compartment of the device which is fluidly separated from the air path may be in fluid communication with the device environment, in particular with ambient air surrounding the device.

Alternatively, the compartment of the device fluidly separated from the air path through the device may also be fluidly sealed from the device environment, in particular from ambient air surrounding the device.

Though the vibration senor is fluidly separated from the air path through the device, sound generated at the sound generating member may readily propagate from the sound generating member towards the vibration senor through different media. That is, the sound may propagate through air within the device, through ambient air surrounding the device and through solid matter of the device, such as a wall member of the device, for example a wall member defining at least a portion of the air path or a wall member separating the above mentioned compartment from the air path. Depending on the sound propagation properties of the different media and depending on the physical structure and dimensions of the device, sound may propagate from the sound generating member straight away towards the vibration senor. Alternatively or in addition, sound may propagate from the sound generating member to the vibration senor via the device environment. That is, sound may at least partially escape from the device and re-enter into the device before reaching the vibration sensor.

The vibration sensor may be arranged within the device such that the transmission of sound into the vibration sensor occurs from air surrounding at least of portion of the vibration sensor. Accordingly, the vibration sensor may be arranged within the device such as to be surrounded at least partially by a fluid, in particular air.

Likewise, the vibration sensor may be arranged within the device such that the transmission of sound into the vibration sensor occurs from solid matter of a device component the vibration sensor is in contact with. For example, the vibration sensor may be arranged at a wall member of the device, such as a wall member of the device fluidly separating the sensor from the air path. In particular, the vibration sensor may be arranged at, in particular on a side of a wall member opposite to a side of the wall member defining at least a portion of the air path through the device.

The vibration sensor may comprise an electro-acoustic transducer. An electro-acoustic transducer is a device configured for converting acoustic energy into electric energy. Depending on the nature of the sound transmission into the vibration sensor, the vibration sensor may comprise, for example, a microphone, an accelerometer, a strain gauge or a piezoelectric acoustic transducer or a magnetic acoustic transducer.

A piezoelectric acoustic transducer is a device that uses the piezoelectric effect to detect sound by measuring changes in pressure, acceleration, strain, or force caused by the sound and by converting the measured change to an electrical signal. Likewise, a magnetic acoustic transducer is a device that uses electromagnetic induction to detect sound by measuring changes in pressure, acceleration, strain, or force caused by the sound and by converting the measured change to an electrical signal.

Likewise, accelerometers or strain gauges may be used to measure the motion and vibration of a structure that is exposed to the dynamic load caused by sound coupling into these kinds of sensors. A strain gauge is a sensor whose resistance varies with applied force. It converts force, pressure, tension into a change in electrical resistance which can be measured. An accelerometer measures proper acceleration of a sensing mass, such as membrane, that responds to oscillations in air pressure or to vibrations/sound in a solid body which the sensing mass is mechanically coupled to.

The microphone may be an electromagnetic microphone (also known as a dynamic or moving-coil microphone) which uses electromagnetic induction converting acoustic energy into electric energy. Electromagnetic microphones are robust, relatively inexpensive and resistant to moisture. Electromagnetic microphones use the same dynamic principle as in a loudspeaker, only reversed. A small movable induction coil, positioned in the magnetic field of a permanent magnet, is attached to the diaphragm. When sound enters the microphone, the sound wave moves the diaphragm. When the diaphragm vibrates, the coil moves in the magnetic field, producing a varying current in the coil through electromagnetic induction. This type of microphone may also be denoted as a magnetic acoustic transducer or may be a specific example of a magnetic acoustic transducer.

The microphone may be an electrostatic microphone, such a condenser microphone, an electret microphone, or a piezoelectric microphone. The latter may also be denoted as a piezoelectric acoustic transducer or may be a specific example of a piezoelectric acoustic transducer, details of which are described below.

The microphone may be a fiber-optic microphone. A fiber-optic microphone converts acoustic waves into electrical signals by sensing changes in intensity of light passing through an optical fiber. During operation, light from a laser source travels through an optical fiber to illuminate the surface of a reflective diaphragm. Sound vibrations of the diaphragm modulate the intensity of light reflecting off the diaphragm in a specific direction. The modulated light is transmitted over a second optical fiber to a photo detector, which transforms the intensity-modulated light into electrical signal. Fiber-optic microphones possess high dynamic and frequency range. Advantageously, fiber-optic microphones do not interfere with electrical, magnetic or electrostatic fields. Therefore, fiber-optic microphones are ideal for use in electrically operated aerosol-generating devices, in particular with regard to inductively heating aerosol-generating devices.

The device may comprise a device housing which comprises the air path through the device. The device housing may be configured to receive the aerosol-forming substrate comprising the substance to be discharged into the airflow through the air path.

In general, the aerosol-generating device may comprise at least one air inlet where air may enter the air path through the device. As such, the air inlet may be considered as a starting point of the air path through the device. Likewise, the aerosol-generating device may comprise at least one air outlet where air may leave the air path through the device. As such, the air outlet may be considered as an end point of the air path through the device. The air outlet may be, for example, provided in a mouthpiece portion of the device.

The aerosol-generating device may comprise a receiving cavity for removably receiving the aerosol-forming substrate or at least a portion of an aerosol-generating article comprising the substrate.

The receiving cavity may comprise an insertion opening through which an aerosol-forming substrate or an aerosol-generating article may be inserted into the receiving cavity. As used herein, the direction in which the aerosol-forming substrate or the aerosol-generating article is inserted is denoted as insertion direction. Preferably, the insertion direction corresponds to the extension of a length axis, in particular a center axis of the receiving cavity.

Upon insertion into the receiving cavity, at least a portion of the aerosol-generating article may still extend outwards through the insertion opening. The outwardly extending portion preferably is provided for interaction with a user, in particular for being taken into a user's mouth. Hence, during use of the device, the insertion opening may be close to the user's mouth.

Accordingly, as used herein, sections close to the insertion opening or close to a user's mouth in use of the device, respectively, are generally denoted with the prefix "proximal". Sections which are arranged further away are generally denoted with the prefix "distal".

With regard to this convention, the receiving cavity may be arranged or located in a proximal portion of the aerosol-generating device. The insertion opening may be arranged or located at a proximal end of the aerosol-generating device, in particular at a proximal end of the receiving cavity.

The air path through the device may extend at least partially through a wall defining at least a portion of the receiving cavity. Such configurations are described, for example, in WO 2013/102609 A2.

In addition or alternatively, the air path through the device may extend at least partially along an inner surface of the receiving cavity. For this, the receiving cavity may comprise a plurality or protrusions extending into the interior of the receiving cavity. Preferably, the plurality of protrusions are distanced from each other such that the air path or at least a portion of the air path through the device is formed in between neighboring protrusions, that is, by the interstices (free space) between neighboring protrusions. In addition, the plurality of protrusions may be configured to contact at least a portion of the aerosol-forming substrate or aerosol-generating article for retaining the substrate or article in the receiving cavity. Examples of such a configuration are described in WO 2018/050735 A1.

With regard to this configuration, an air inlet of the device preferably is realized at an insertion opening of the receiving cavity used for inserting the substrate or the article into the cavity. When the substrate or article is received in the cavity, air may be drawn into the receiving cavity at the rim of the insertion opening and further through that portion of the air path formed between the inner surface of the receiving cavity and the outer circumference of the aerosol-forming substrate or aerosol-generating article.

Preferably, a portion of the air path extends through the aerosol-forming substrate or the article. From there, the air path may directly pass into a user's mouth. Alternatively, the air path may extend through a mouthpiece portion of the device where it leaves the device at an air outlet in the mouthpiece portion.

The aerosol-generating device may comprise one or more end stops arranged within the receiving cavity, in particular at a distal end of the receiving cavity. The one or more end stops preferably are configured to limit an insertion depth of the aerosol-forming substrate or the aerosol-generating article into the receiving cavity. In particular, the one or more end stops may be configured to prevent the aerosol-forming substrate or the aerosol-generating article from abutting a distal end surface of the receiving cavity that is opposite to an insertion opening of the receiving cavity at a proximal end of the receiving cavity. Thus, the one or more end stops advantageously provide free space within a distal portion of the receiving cavity allowing free air flow between a distal end of the receiving cavity and a distal end of an aerosol-generating article when the substrate or the article is received in the receiving cavity. The one or more end stops may comprise a contact surface which an aerosol-generating article, in particular a distal end of an aerosol-generating article may abut when the article is received in the receiving cavity.

Preferably, the aerosol-generating device may comprise a plurality of separate end stops, for example three end stops, which are arranged within the receiving cavity, in particular at a distal end of the receiving cavity.

The plurality of end stops may be symmetrically arranged around a length axis, in particular a center axis of the receiving cavity. Preferably, the plurality of end stops may be arranged equally spaced around the length axis, in particular the center axis of the receiving cavity. As described above, this enables free air flow around the end stops and an article received in the receiving cavity.

In general, the receiving cavity may have any suitable shape. In particular, the shape of the receiving cavity may correspond to the shape of the aerosol-forming substrate or the aerosol-generating article to be received therein. Preferably, the receiving cavity may have a substantially cylindrical shape or a tapered shape, for an example substantially conical or substantially frustoconical shape.

Likewise, the receiving cavity may have any suitable cross-section as seen in a plane perpendicular to a length axis of the receiving cavity or perpendicular to an insertion direction of the article. In particular, the cross-section of the receiving cavity may correspond to the shape of the aerosol-generating article to be received therein. Preferably, the receiving cavity has a substantially circular cross-section. Alternatively, the receiving cavity may have a substantially elliptical cross-section or a substantially oval cross-section or a substantially square cross-section or a substantially rectangular cross-section or a substantially triangular cross-section or a substantially polygonal cross-section. As used herein, the above mentioned shapes and cross-sections preferably refer a shape or a cross-section of the receiving cavity without considering any protrusions.

The receiving cavity may be formed as a receiving cavity module, in particular as a tubular sleeve, which may be inserted into a main body of the aerosol-generating device. Advantageously, this allows for a modular assembly of the aerosol-generating device.

Alternatively, at least a part of the receiving cavity may be integrally formed with the main body. By providing at least a part of the receiving cavity as a part of the main body the quantity of parts need to build up the aerosol-generating device may be reduced.

The sound generating member may be located in a distal end portion of the receiving cavity, in particular on a distal end surface of the receiving cavity. The distal end surface of the receiving cavity may be formed by a wall member separating the receiving cavity from other portions of the device, in particular a portion of the device which comprises the vibration sensor and/or electronic parts (electrical circuitry, controller, power supply). Preferably, the vibration sensor is arranged at a side of such a wall member opposite to the side of the wall member defining distal end surface of the receiving cavity.

In addition to the vibration sensor, the puff detector may further comprise an electrical circuitry for converting the output signal of the vibration sensor into a signal indicative of a sound. The electrical circuitry may comprise at least one of a transimpedance amplifier for current-to-voltage conversion, an inverting signal amplifier, a single-ended to-differential converter, an analog-digital converter and a microcontroller.

The puff detector or the electrical circuitry may further comprise one or more electronic filters for filtering the output signal of the vibration sensor. Advantageously, filtering may allow reducing different types of noise, in particular parasitic noise detected by the vibration sensor.

In general, aerosol generation, in particular substance release from the aerosol-forming substrate into airflow through the device may be realized in different ways, as described further above.

For example, the device may comprise an atomizer for dispersing particles or droplets of an aerosol-forming substrate into an airflow such as to form an inhalable aerosol. The atomizer may be an ultrasonic atomizer.

Alternatively, the aerosol-generating device may comprise an electrical heater for heating an aerosol-forming substrate which is capable of releasing volatile compounds forming an inhalable aerosol when heated and released into an airflow.

The electrical heater of the aerosol-generating device may be an inductive heater. The inductive heater may comprise an induction source including an inductor which is configured to generate an alternating, in particular high-frequency electromagnetic field within the device, in particular within a receiving cavity of the device as described above. The alternating, in particular high-frequency electromagnetic field may be in the range between 500 kHz (kilo-Hertz) to 30 MHz (Mega-Hertz), in particular between 5 MHz to 15 MHz, preferably between 5 MHz and 10 MHz. The alternating electromagnetic field is used to inductively heat a susceptor which is in thermal contact with or thermal proximity to the aerosol-forming substrate to be heated. The inductor may be arranged such as to surround the susceptor and at least a portion of the aerosol-forming substrate in use of the device. The inductor may be an inductor coil, for example a helical coil, arranged within a side wall of the receiving cavity. For example, the inductor may be arranged such as to surround at least a portion of the receiving cavity.

Alternatively, the heater may be a resistive heater comprising a resistive heating element. The heating resistive element is configured to heat up when an electrical current is passed therethrough due to an immanent ohm resistance or resistive load of the resistive heating element. For example, the resistive heating element may comprise at least one of a resistive heating wire, a resistive heating track, a resistive heating grid or a resistive heating mesh. In use of the device, the resistive heating element is in thermal contact with or thermal proximity to an aerosol-forming substrate to be heated.

The aerosol-generating device may further comprise a controller operatively coupled with the puff detector for determining a user's puff based on signals provided by the vibration sensor, in particular based on a signal provided by the puff detector which is indicative of an airflow through the air path of the device.

The controller may further be configured to control the overall operation of the aerosol-generating device, in particular the heating process. Based on the signal indicative of n airflow, the controller may be in particular configured to control the substance release from the aerosol-forming substrate into the airflow. For example, in case the aerosol-generating device comprises an electrical heater for heating the aerosol-forming substrate, the controller may be operatively coupled to the heater and configured to control the heating process in order to maintain the heating temperature at a certain level when a user takes a puff.

The controller and at least parts of the puff detector may be integral part of an overall electrical circuitry of the aerosol-generating device.

The aerosol-generating device may comprise a power supply, preferably a battery such as a lithium iron phosphate battery. As an alternative, the power supply may be another form of charge storage device such as a capacitor. The power supply may require recharging and may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the heating device.

The present invention further relates to an aerosol-generating system comprising an aerosol-generating device according to the invention and as described herein. The system further comprises an aerosol-generating article including at least one aerosol-forming substrate to be heated by the device, wherein at least a portion of the article is removably receivable or removably received in the device, in particular in a receiving cavity of the device.

The aerosol-generating article may be a consumable, in particular intended for single use. The aerosol-generating article may be a tobacco article. In particular, the article may be a rod-shaped article, preferably a cylindrical rod-shaped article, which may resemble conventional cigarettes.

The article may comprise one or more of the following elements: a filter element, a cooling element, a first support element, a substrate element, and an optional second support element. Preferably, the aerosol-generating article comprises at least a first support element, a second support element and a substrate element located between the first support element and the second support element.

All of the aforementioned elements may be sequentially arranged along a length axis of the article in the above described order, wherein the first support element preferably is arranged at a distal end of the article and the filter element preferably is arranged at a proximal end of the article. Each of the aforementioned elements may be substantially cylindrical. In particular, all elements may have the same outer cross-sectional shape. In addition, the elements may be circumscribed by an outer wrapper such as to keep the elements together and to maintain the desired cross-sectional shape of the rod-shaped article. Preferably, the wrapper is made of paper.

In case of an inductively heating aerosol-generating system, the article may further comprise a susceptor. The susceptor positioned in thermal proximity to or thermal contact with the aerosol-forming substrate such that in use the susceptor is inductively heatable by the inductive heating arrangement when the article is received in the cavity of the device. For example, the susceptor may be a susceptor strip or a susceptor blade or a susceptor tube or a susceptor sleeve. The susceptor may be part of the substrate element. As used herein, the term "susceptor" refers to an element that is capable to convert electromagnetic energy into heat when subjected to an alternating magnetic field. This may be the result of hysteresis losses and/or eddy currents induced in the susceptor, depending on the electrical and magnetic properties of the susceptor material. Hysteresis losses occur in ferromagnetic or ferrimagnetic susceptors due to magnetic domains within the material being switched under the influence of an alternating electromagnetic field. Eddy currents may be induced if the susceptor is electrically conductive. In case of an electrically conductive ferromagnetic or ferrimagnetic susceptor, heat can be generated due to both, eddy currents and hysteresis losses.

At least one of the first support element and the second support element may comprise a central air passage. Preferably, at least one of the first support element and the second support element may comprise a hollow cellulose acetate tube. Alternatively, the first support element may be used to cover and protect the distal front end of the substrate element.

The aerosol-cooling element is an element having a large surface area and a low resistance to draw, for example 15 mmWG to 20 mmWG. In use, an aerosol formed by volatile compounds released from the substrate element is drawn through the aerosol-cooling element allowing formation and cooling of an aerosol before being transported to the proximal end of the aerosol-generating article.

The filter element preferably serves as a mouthpiece, or as part of a mouthpiece together with the aerosol-cooling element. As used herein, the term "mouthpiece" refers to a portion of the article through which the aerosol exits the aerosol-generating article.

Likewise, the aerosol-generating article may be a capsule containing an aerosol-forming powder (as aerosol-forming substrate) that is to be dispersed into an airflow in order to generate an aerosol.

Further features and advantages of the aerosol-generating system and the aerosol-generating article according to the present invention have already been described above with regard to aerosol-generating device and equally apply.

As used herein, the term "aerosol-forming substrate" relates to a substrate capable of releasing volatile compounds that can form an aerosol.

In particular, the aerosol-forming substrate may be a substrate capable of releasing volatile compounds that can form an aerosol when heated. Such an aerosol-forming substrate is intended to be heated rather than combusted in order to release the aerosol-forming volatile compounds. The aerosol-forming substrate may be a solid aerosol-forming substrate or a liquid aerosol-forming substrate or a gel-like aerosol-forming substrate, or any combination thereof. That is, the aerosol-forming substrate may comprise, for example, both solid and liquid components. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerin and propylene glycol. The aerosol-forming substrate may also comprise other additives and ingredients, such as nicotine or flavorings. The aerosol-forming substrate may also be a paste-like material, a sachet of porous material comprising aerosol-forming substrate, or, for example, loose tobacco mixed with a gelling agent or sticky agent, which could include a common aerosol former such as glycerin, and which is compressed or molded into a plug.

Likewise, the aerosol-forming substrate may be an aerosol-forming powder. The aerosol-forming powder may comprise a nicotine powder. The term "nicotine" refers to nicotine and nicotine derivatives such as nicotine salts. Accordingly, the nicotine powder may be a nicotine salt or nicotine salt hydrate. Suitable nicotine salts or nicotine salt hydrates include, for example, nicotine tartrate, nicotine aspartate, nicotine lactate, nicotine glutamate, nicotine bitartrate, nicotine salicylate, nicotine fumarate, nicotine monopyruvate, nicotine hydrochloride, and combinations thereof.

The nicotine powder may have any suitable particle size distribution for pulmonary delivery of the nicotine to a user. In particular, at least about 90 weight percent (wt %) of the nicotine powder may have a particle size of about 10 micrometers or less, preferably about 7 micrometers or less. The nicotine powder preferably has a mean average diameter ranging from about 0.1 to about 10 micrometers, more preferably from about 1 to about 7 micrometers, particularly preferably from about 2 to about 6 micrometers.

The nicotine powder particles may be surface modified, for example the nicotine salt particles may be coated. A preferred coating material is L-leucine. Particularly suitable nicotine powder particles include L-leucine coated nicotine bitartrate, L-leucine coated nicotine glutamate and L-leucine coated asparate.

The capsule preferably contains between about 5 and about 20 milligrams of nicotine powder, in particular about 10 milligrams of nicotine powder. Preferably, the capsule preferably contains sufficient nicotine powder to deliver between about 10 and about 30 puffs to a user.

The nicotine powder described herein preferably is carrier-free. Being carrier-free allows the nicotine powder to be inhaled and delivered to the user's lungs at inhalation or airflow rates that are similar to typical smoking regime inhalation or airflow rates. In addition, since the nicotine powder is carrier-free, the airflow path of the inhaler can have simple geometry or a simple configuration.

Nevertheless, the aerosol-forming powder may further contain carrier particles that serve to increase the fluidization of the active particles and to improve the dose uniformity by acting as a diluent or bulking agent in a formulation.

Alternatively or in addition to nicotine powder, the aerosol-forming powder may also comprise another active agent or ingredient, such as an active pharmaceutical material. This active agent or ingredient can be blended in the same capsule. The second active agent or ingredient can have a similar mean average diameter size range as the nicotine powder described above.

Below, there is provided a non-exhaustive list of non-limiting examples. Any one or more of the features of these examples may be combined with any one or more features of another example, embodiment, or aspect described herein.

EXAMPLE EX1

Electrically operated aerosol-generating device for generating an aerosol by releasing a substance of an aerosol-forming substrate into an airflow, the device comprising:
an air path which extends through the device and is configured to support an airflow in the device;
a sound generating member which is arranged in fluid communication with the air path and configured to generate sound caused by an airflow passing the sound generating member in use of the device when a user takes a puff; and
a puff detector comprising a vibration sensor, wherein the vibration sensor is fluidly separated from the air path and configured to detect the sound propagating from the sound generating member to the vibration sensor, thereby allowing to detect an airflow through the device being indicative of a user's puff.

EXAMPLE EX2

Aerosol-generating device according to example EX 1, wherein the sound generating member comprises a sound generating displacement structure for at least partially displacing the airflow when passing the sound generating displacement structure.

EXAMPLE EX3

Aerosol-generating device according to example Ex2, where the sound generating displacement structure comprises at least one of: one or more grooves or one or more ridges, one or more dimples, or one or more protrusions.

EXAMPLE EX4

Aerosol-generating device according to example Ex3, wherein a length extension of the one or more grooves, or a length extension of the one or more ridges, or a length extension one or more grooves and a length extension of the one or more ridges is transverse, in particular perpendicular to a direction of the airflow passing the sound generating member in use of the device.

EXAMPLE EX5

Aerosol-generating device according to any one of examples Ex3 to Ex4, wherein the one or more grooves, or the one or more ridges, or the one or more grooves and the one or more ridges comprise one of a triangular shape, a sinusoid shape, or a rectangular shape.

EXAMPLE EX6

Aerosol-generating device according to any one of examples Ex3 to Ex5, wherein at least one of a height of the ridges or a depth of the grooves varies, in particular increases along the sound generating displacement structure in a direction of the airflow passing the sound generating member in use of the device.

EXAMPLE EX7

Aerosol-generating device according to anyone examples Ex3 to Ex6 wherein the plurality of grooves, ridges, dimples or protrusions is evenly or unevenly distributed along the air passage.

EXAMPLE EX8

Aerosol-generating device according to any one example Ex1 to Ex7, where the sound generating member, in particular the sound generating displacement structure is part of or integral with a wall member defining at least a portion of the air path through the device.

EXAMPLE EX9

Aerosol-generating device according to any one example Ex2 to Ex8, wherein the sound generating displacement structure comprises a periodic pattern.

EXAMPLE EX10

Aerosol-generating device according to example Ex9, wherein the periodic pattern has a period length in a range between 0.1 millimeter and 2 millimeter, in particular between 0.2 millimeter and 1 millimeter, preferably between 0.25 millimeter and 0.5 millimeter.

EXAMPLE EX11

Aerosol-generating device according to any one of examples Ex8 to Ex10, wherein periodic pattern is a linear periodic pattern or a non-linear periodic pattern.

EXAMPLE EX12

Aerosol-generating device according to any one of examples Ex8 to Ex11, wherein periodic pattern is a one-dimensional periodic pattern, in particular an array of a plurality of parallel grooves or ridges.

EXAMPLE EX13

Aerosol-generating device according to any one of examples Ex8 to Ex11, wherein the periodic pattern comprises a first array of a plurality of parallel first grooves or first ridges having a first periodicity along a first direction, and a second array of a plurality of parallel second grooves or second ridges having a second periodicity along a second direction.

EXAMPLE EX14

Aerosol-generating device according to example Ex13, wherein the first direction and the second direction are transverse, in particular perpendicular to each other.

EXAMPLE EX15

Aerosol-generating device according to any one of examples Ex8 to Ex10, wherein the periodic pattern comprises at least one a one or more curved, in particular ring-shaped grooves or one or more curved, in particular ring-shaped ridges.

EXAMPLE EX16

Aerosol-generating device according to any one of examples Ex8 to Ex10, wherein the periodic pattern comprises a concentric ring pattern formed a plurality of ring-shaped grooves or a plurality of ring-shaped ridges

EXAMPLE EX17

Aerosol-generating device according to any one of examples Ex8 to Ex10, wherein the periodic pattern comprises a spiral pattern formed be spiral-shaped groove or ridge.

EXAMPLE EX18

Aerosol-generating device according to any one of examples Ex3 to Ex10, wherein the periodic pattern may comprise honeycomb pattern comprising a plurality of grooves or ridges forming the contour of honeycomb pattern.

EXAMPLE EX19

Aerosol-generating device according to any one of examples Ex2 to Ex18, wherein the sound generating displacement structure is a rigid structure.

EXAMPLE EX20

Aerosol-generating device according to any one of the preceding examples, wherein the sound generating member, in particular the sound generating displacement structure is a separate member or element, separate from, in particular attached to a wall member defining at least a portion of the air path through the device.

EXAMPLE EX21

Aerosol-generating device according to any one of the preceding examples, wherein the sound generating member comprises at least one airflow-driven vibration element configured to periodically interrupt an airflow passing the vibration element.

EXAMPLE EX22

Aerosol-generating device according to example Ex21, wherein the at least one vibration element comprises a reed or a lamella or a pair of reeds or a pair of lamellae.

EXAMPLE EX23

Aerosol-generating device according to any one of the preceding examples, wherein the air path and the sound generating member are configured such that the sound generated in use of the device is in a frequency range above 15 kilo-Hertz (kHz), preferably above 20 kilo-Hertz (kHz), more preferably above kilo-Hertz (kHz).

EXAMPLE EX24

Aerosol-generating device according to any one of the preceding examples, wherein the vibration sensor is arranged in a compartment of the device which is fluidly separated from the air path through the device.

EXAMPLE EX25

Aerosol-generating device according to example EX 24, wherein the compartment of the device, which is fluidly separated from the air path, is in fluid communication with the device environment.

EXAMPLE EX26

Aerosol-generating device according to example EX 24, wherein the compartment of the device, which is fluidly separated from the air path, is fluidly sealed from the device environment, in particular from ambient air surrounding the device.

EXAMPLE EX27

Aerosol-generating device according to any one of the preceding examples, wherein the vibration sensor comprises a microphone, an accelerometer, a strain gauge or piezo transducer or a magnetic acoustic transducer.

EXAMPLE EX28

Aerosol-generating device according to any one of the preceding examples, wherein the wherein the vibration sensor is arranged at a side of a wall member opposite to a side of the wall member defining at least a portion of the air path through the device.

EXAMPLE EX29

Aerosol-generating device according to any one of the preceding examples, wherein the device comprises a receiving cavity for removably receiving the aerosol-forming substrate or at least a portion of an aerosol-generating article comprising the substrate.

EXAMPLE EX30

Aerosol-generating device according to example Ex29, wherein the receiving cavity may comprise an insertion opening through which an aerosol-forming substrate or an aerosol-generating article may be inserted into the receiving cavity

EXAMPLE EX31

Aerosol-generating device according to any one of examples Ex29 to Ex30, wherein the air path extends at least partially along an inner surface of the receiving cavity and/or through a wall defining at least a portion of the receiving cavity.

EXAMPLE EX32

Aerosol-generating device according to any one of examples Ex29 to Ex31, wherein the sound generating member is located in a distal end portion of the receiving cavity, in particular on a distal end surface of the receiving cavity.

EXAMPLE EX33

Aerosol-generating device according to any one of the preceding examples, wherein the puff detector comprises one or more electronic filters for filtering the output signal of the vibration sensor.

EXAMPLE EX34

Aerosol-generating device according to any one of the preceding examples, further comprising an atomizer for dispersing particles or droplets of an aerosol-forming substrate into an airflow such as to form an inhalable aerosol.

EXAMPLE EX35

Aerosol-generating device according to any one of examples Ex1 to Ex33, further comprising an electrical heater for heating an aerosol-forming substrate.

EXAMPLE EX36

Aerosol-generating device according to example Ex35, wherein comprising an electrical heater comprises an inductive heater or a resistive heater.

EXAMPLE EX37

Aerosol-generating device according to example Ex35, wherein the inductive heater comprises an inductor, in particular an induction coil, for generating an alternating magnetic field within the device, in particular within a receiving cavity of the device.

EXAMPLE EX38

An aerosol-generating system comprising an aerosol-generating device according to any one of the examples and an aerosol-generating article comprising an aerosol-forming substrate, wherein at least a portion of the article is removably receivable or removably received in the device, in particular in a receiving cavity of the device.

Examples of the invention will be further described, with reference to the accompanying figures, in which:

FIG. 1 schematically illustrates a first exemplary embodiment of an aerosol-generating device according to the present invention in a sectional view;

Figure 1:
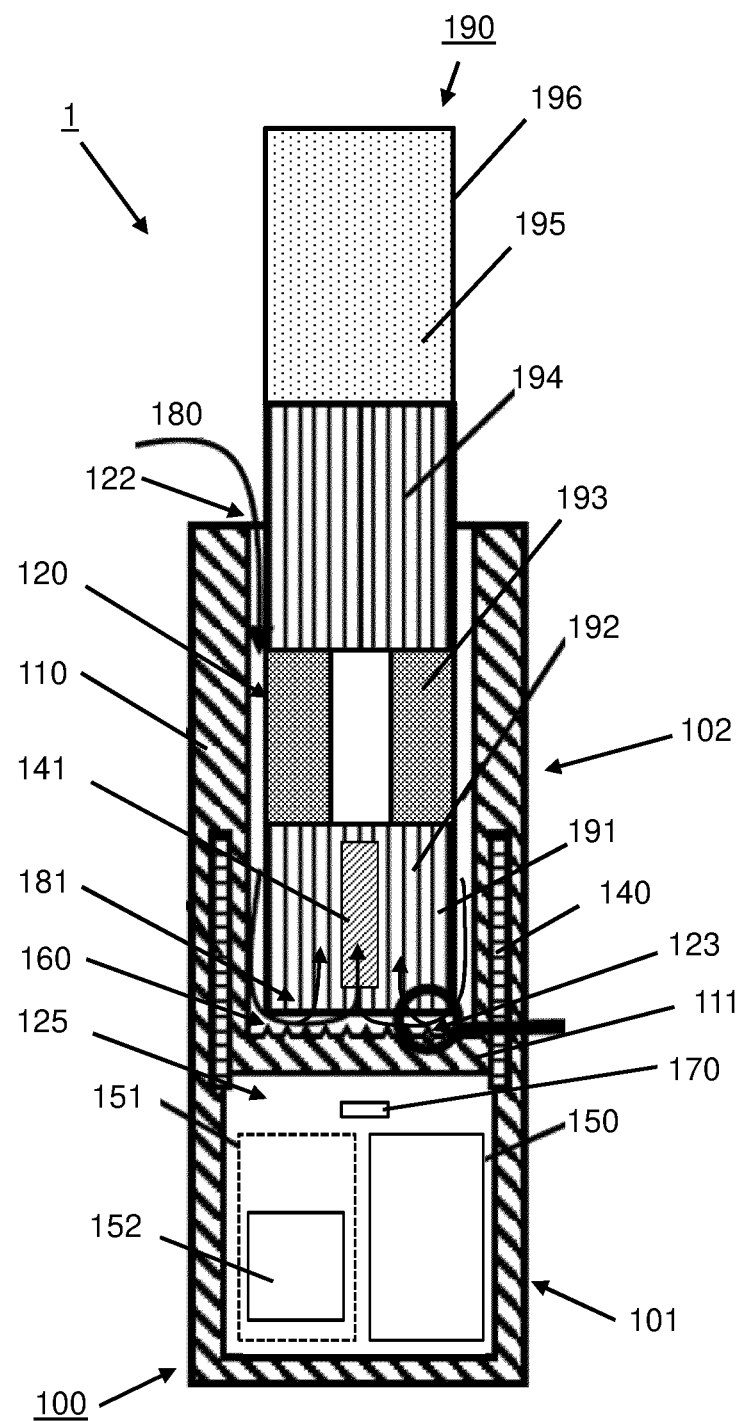

FIG. 1 schematically illustrates a first exemplary embodiment of an aerosol-generating system 1 according to the present invention. The system 1 comprises two main components: an electrically operated aerosol-generating device 100 and an aerosol-generating article 190 for use with the device 100. The device 100 is configured for heating an aerosol-forming substrate 191 comprised within the article 190. The substrate 191 is capable of releasing volatile compounds forming an inhalable aerosol when being heated and released into an airflow passing through the system in use 1.

The aerosol-generating device 100 has an elongated shape and comprises a distal portion 101 and a proximal portion 102. Within the proximal portion 102, the device 100 comprises a receiving cavity 120 formed in the device housing 110 for receiving at least a portion of the aerosol-generating article 190. Within the distal portion 101, the device 100 comprises electronics, in particular a power source 150 and an electrical circuitry 151 including a controller 152, for powering and controlling operation of the aerosol-generating device 100.

The article 190 has a rod shape resembling the shape of a conventional cigarette. In the present embodiment, the article 190 comprises four elements arranged sequentially one after the other in coaxial alignment: a substrate element 192, a support element 193, an aerosol-cooling element 194, and a filter element 195. The substrate element 192 is arranged at a distal end of the article 190 and comprises the aerosol-forming substrate 191 to be heated. The aerosol-forming substrate 191 may include, for example, a crimped sheet of homogenized tobacco material including glycerin as an aerosol-former. The support element 193 comprises a hollow core forming a central air passage. The cooling element 194 has a large surface area and a low resistance to draw, allowing an aerosol formed by volatile compounds released from the substrate element 192 to cool down before being transported to the proximal end of the article 190. The filter element 195 serves as a mouthpiece and may include, for example, cellulose acetate fibers for filtering the aerosol. The four elements 192, 193, 194 and 195 are substantially cylindrical in shape and have about the same diameter. The elements are circumscribed by an outer wrapper 196 made of cigarette paper such as to form a cylindrical rod. The outer wrapper 196 may be wrapped around the aforementioned elements so that free ends of the wrapper overlap each other. The wrapper may further comprise adhesive that adheres the overlapped free ends of the wrapper to each other.

For heating the substrate 191 within the article 190, the aerosol-generating device 100 according to the present invention comprises an inductive heating device. The inductive heating device comprises an induction coil 140 for generating an alternating, in particular high-frequency magnetic field within the receiving cavity 120. Preferably, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz). In the present embodiment, the induction coil 140 is a helical coil arranged within the device housing 110. The coil 140 circumferentially surrounds a portion of the cylindrical cavity 120 in coaxial alignment with the length axis of the receiving cavity 120. The alternating magnetic field is used for in inductively heating a susceptor 141 that is arranged within the aerosol-forming substrate 191 of the article 190 such as to experience the magnetic field generated by the induction coil 140 when the article 190 is received in the cavity 120. In the present embodiment, the susceptor 140 is a susceptor blade that is arranged within the substrate element 192 along the length axis of the article 190 such as to be in direct physical contact with aerosol-forming substrate 191.

Accordingly, when the inductive heating device is actuated, a high-frequency alternating current is passed through the induction coil 140 causing an alternating magnetic field to be generated within the cavity 120. Depending on the magnetic and electric properties of the susceptor material, the alternating magnetic field induces at least one of eddy currents or hysteresis losses in the susceptor 141. As a consequence, the susceptor 141 heats up until reaching a temperature that is sufficient to vaporize volatile compounds from the aerosol-forming substrate 191. The vaporized compounds are released and entrained in an airflow passing through the article 190 from the substrate element 192 at the distal end of the article 190, through the support element 193 and the cooling element 194 towards the filter element 195. Along this way, the vaporized substances cool down to form an inhalable aerosol which subsequently may escape from the article 190 through the filter element 195 at the proximal end proximal end of the article 190. According to the invention, the aerosol-generating device 100 comprises an air path 180 to provide airflow through the system 1 in which substances of the aerosol forming substrate may be released in in order to form an inhalable aerosol. As indicated by the curved arrows 180 in FIG. 1, the aerosol-generating article system 1 of the present embodiment comprises an air path starting at an insertion opening 122 at the proximal end of the receiving cavity 120 is used for inserting the aerosol-generating article 190 into the cavity 120. As such, the insertion opening 122 also serves as an air inlet of the device 100. The air path 180 further extends along the inner surface of the receiving cavity 120 towards the distal end surface (bottom) of the receiving cavity 120. The latter portion of the air path is formed between the inner surface of the receiving cavity 120 and the outer circumference of the aerosol-generating article 190 upon being inserted into the cavity 120. As described further above, the latter portion of the air path may be provided, for example, by interstices (free space) between protrusions (not shown) that are part of the inner surface of the receiving cavity 120 and used for providing a clamping retention of the article 190 in the cavity 120. At the distal end surface (bottom) of the receiving cavity 120, the air path is redirected into the proximal direction—as illustrated by the curved arrows 181 in FIG. 1—such as to enter into the substrate element 192 of the aerosol-generating article 190. From there, the air path further extends through the various elements 192, 193, 194 and 195 of the article 190 where it finally leaves the system 1, as described above with regard to the aerosol-generating article 190.

Accordingly, when a user takes a puff, that is, when a negative pressure is applied at the filter element 195 of the article 190 received in the cavity 120, air is drawn into the receiving cavity 120 at the rim of the insertion opening 122 and further along the air path into the bottom portion at the distal end of the receiving cavity 120. There, the airflow enters the aerosol-generating article 190 through the substrate element 192, and further passes through the support element 193, the aerosol cooling element 194 and the filter element 195 where it finally exits the article 190. Hence, when the induction heating device is on, vaporized material from the aerosol-forming substrate is entrained into the air flow through the substrate element 192 and subsequently cooled down on its further way through the support element 193, the aerosol cooling element 194 and the filter element 195 such as to form an aerosol.

In order to enable a proper redirection of the air flow into the aerosol-generating article 190 at the bottom portion of the receiving cavity 120, the aerosol-generating device 100 may comprise one or more end stops (not shown) which may be arranged in the distal end portion of the receiving cavity 130 such as to limit the insertion depth of the article 190 into the cavity 120 and, thus, to prevent the article 190 from abutting the distal end surface 123 of the receiving cavity 120.

As mentioned further above, proper puff detecting is important to ensure an accurate control of the heating process. For this, the aerosol-generating device 100 according to the present embodiment comprises a puff detector which comprises a vibration sensor 170 to detect sound caused by airflow through the air path 180, 181 of the device 100 which in turn is indicative of a user taking a puff. In the present embodiment, the vibration sensor 170 is a microphone, for example a moving coil microphone. As can be seen in FIG. 1, the vibration sensor 170 is arranged outside the receiving cavity 120, fluidly separated from the air path 180, 181 that passes through the device 100. Due to the separated arrangement, the vibration sensor 170 is not exposed to the conditions in the air path, such as temperature and moisture. In particular, the vibration sensor 170 is insulated from suspended particles or droplets originating from the aerosol formation, and thus protected from any depositions. In the present embodiment, the vibration sensor 170 is arranged in a compartment 125 in the distal portion 101 which also includes the power source 150 and the electric circuitry 151 including the controller 152 as mentioned above. The compartment 125 is fluidly separated from the receiving cavity 120 in the proximal portion 102 of the device 100.

To enhance the sound effects which are indicative of the airflow through the device 100 and used to identify of a user's puff, the aerosol-generating device 100 further comprises a sound generating member 160. The sound generating member 160 is arranged in fluid communication with the air path 180, 181 described above and configured to generate sound caused by the airflow which passes the sound generating member 160 when a user takes a puff. In the present embodiment, the sound generating member 160 comprises a sound generating displacement structure which is configured to displace the airflow 181 at least partially when passing the sound generating displacement structure.

Figure 2:
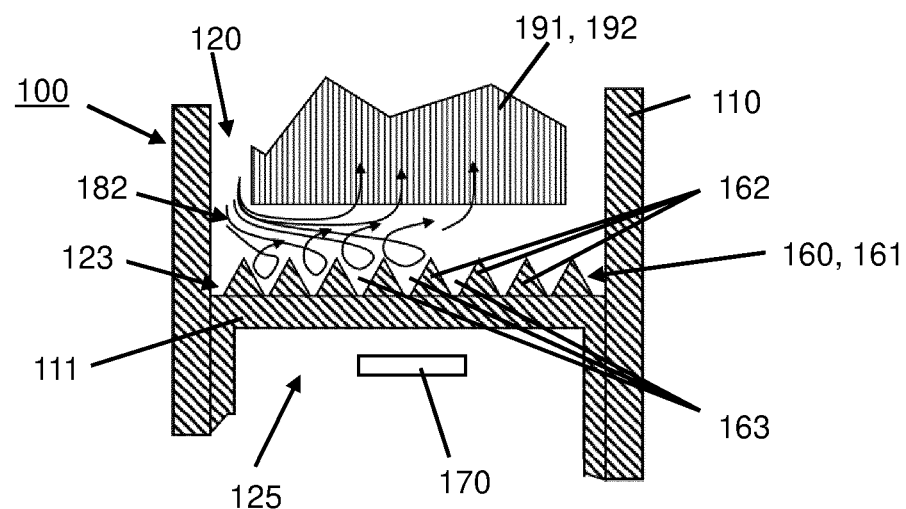
FIG. 2 shows details of the aerosol-generating device according to FIG. 1.
Figure 3:
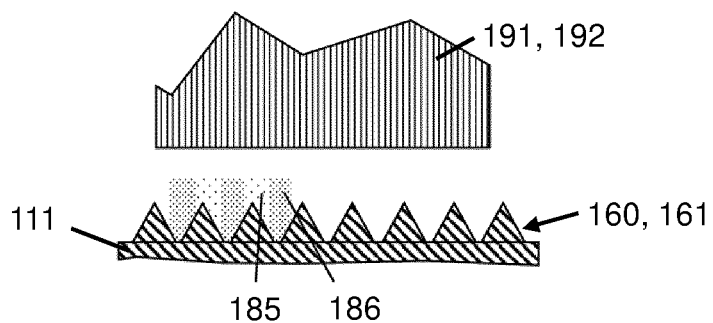
FIG. 3 shows further details of the sound generating member of the aerosol-generating device according to FIG. 1.
Figure 4:
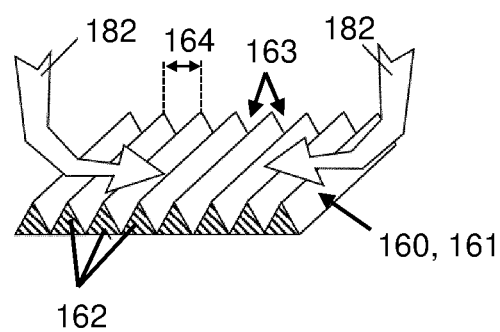
FIG. 4 shows details of the sound generating member of the aerosol-generating device according to FIG. 1.

FIG. 2, FIG. 3 and FIG. 4 show details of the sound generating displacement structure 161 implemented in the device according to FIG. 1. In the present embodiment, the sound generating displacement structure 161 comprises a one-dimensional array of ridges 162 arranged in a periodic pattern at the distal end of the receiving cavity 120 (FIG. 2-4 not to scale). The grooves 163 are formed between each two adjacent ridges 106. The cross-sectional shape of the ridges 162 is substantially triangular such that each ridge 162 has a sharp edge at its top.

Hence, when the airflow 182 passes the sound generating displacement structure 161, the airflow 182 is partially displaced due to collisions with the ridges 162 of the displacement structure 161, causing a part of the airflow 180 to become turbulent, as indicated in FIG. 2. Due to this, part of the kinetic energy of the airflow, that is, the dynamic pressure is transformed into a static pressure resulting in a plurality of alternating high-pressure and low-pressure regions 185, 186, as shown in FIG. 3. The alternating pattern of adiabatic compressions and decompressions in the airflow 180 gives rise to an acoustic wave, that is, sound, which propagates through the device 100. Originating from the sound generating displacement member 161, the acoustic wave propagates—inter alia—through the wall member 111 which fluidly separates the receiving cavity 120 from the compartment 125. The acoustic wave propagates further through the air within the compartment 125 until reaching the vibrations sensor 170. There, the acoustic wave (sound) is detected, thus indicating the presence of airflow through the device 100 which in turn is indicative of user taking a puff. As such, the sound generating displacement structure 161 is part of a wall member, that is, the wall member 111, defining at least a portion of the air path through the device 100.

In addition to the vibration sensor 170, the puff detector further comprises an electrical circuitry which is operatively coupled to the vibration sensor 170 and configured to convert the output signal of the vibration center 170 into a signal indicative of the presence of airflow in the receiving cavity 120. The electrical circuitry may further comprise one or more electronic filters for filtering the output signal of the vibration sensor. Advantageously, filtering may allow reducing different types of noise, in particular parasitic noise detected by the vibration sensor 170. The electrical circuitry of the puff detector may be integral part of electrical circuitry 151 including the controller 152. Based on the signal indicating the presence of airflow through the device 100, the controller 152 may adjust control of the heating process in order to maintain the heating temperature of the substrate 191 in the article 190 at a certain level when a user takes a puff.

The length 164 of the periodic pattern of the sound generating displacement structure 161—as shown in FIG. 4—is chosen such as to generate a sound in specific frequency range depending on the velocity of the airflow 182. For example, if the velocity of the airflow 182 at the sound generating displacement structure 161 is about 10 meters per second, and the displacement structure 161 comprises ridges 162 appearing each 0.25 millimeter, the sound has a frequency of about 40 kilo-Hertz (kHz). This frequency is outside the frequency audible by human beings and also outside the frequency range audible by many animals, in particular pets, for example, dogs or cats.

Figure 5:
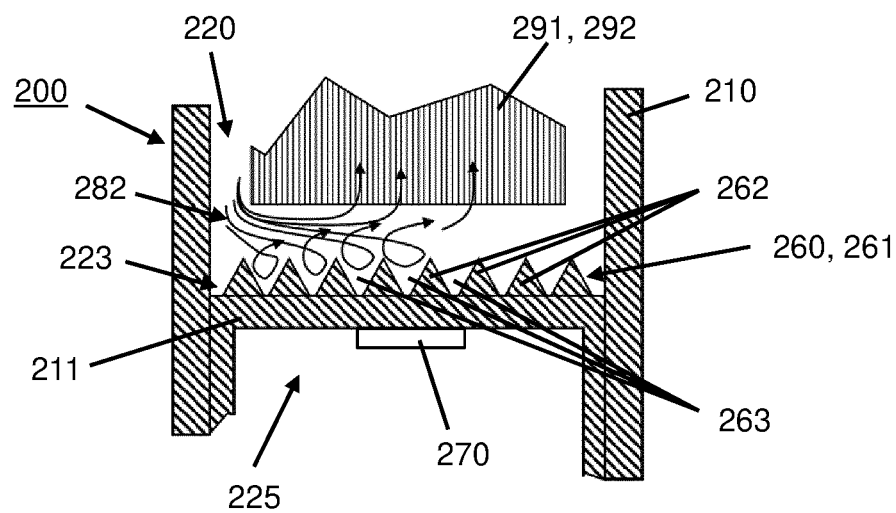
FIG. 5 schematically illustrates a second exemplary embodiment of an aerosol-generating device according to the present invention in a sectional view.

FIG. 5 shows a second embodiment of the aerosol-generating device 100 according to the present invention. In this embodiment, the vibration sensor 270 is attached to the wall member 211 which fluidly separates the receiving cavity 220 from the compartment 225. That is, the vibration sensor 270 is arranged at a side of a wall member 211 opposite to a side of that wall member 211 which defines at least a portion of the air path through the device 200 and which also forms or at least supports the sound generating displacement structure 261. As a consequence, the vibration sensor 270 is closer to, in particular directly coupled to the sound generating displacement structure 261, that is, to the source of sound. Advantageously, this configuration enhances the detectability of the sound propagating through the device 100. Apart from that, the embodiment according to FIG. 5 is identical to the first embodiment shown in FIG. 1-3. Accordingly, identical or similar features are denoted with the same reference numbers, yet incremented by 100.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5% of A.

The invention claimed is:

1. An electrically operated aerosol-generating device for generating an aerosol, the device comprising:
    a receiving cavity configured to removably receive an aerosol-forming substrate or at least a portion of an aerosol-generating article comprising an aerosol-forming substrate, the receiving cavity comprises an insertion opening at a proximal end through which the aerosol-forming substrate or the aerosol-generating article can be inserted into the receiving cavity, and a wall member defining a distal end surface of the receiving cavity opposite to the proximal end;
    an air path, which extends through the device from the insertion opening towards the distal end surface and is configured to support an airflow in the device;
    a sound-generating member, which is arranged in fluid communication with the air path and is configured to generate sound caused by an airflow passing the sound-generating member when a user takes a puff; and
    a puff detector comprising a vibration sensor, wherein the vibration sensor is configured to detect sound propagating from the sound-generating member to the vibration sensor,
    wherein the wall member fluidly separates the receiving cavity from a compartment of the device which houses the vibration sensor, and wherein the sound-generating member is disposed on the distal end surface formed by the wall member and/or is part of the wall member.

2. The electrically operated aerosol-generating device according to claim 1, wherein the sound-generating member comprises a sound-generating displacement structure configured to at least partially displace the airflow when passing the sound-generating displacement structure.

3. The electrically operated aerosol-generating device according to claim 2, where the sound-generating displacement structure comprises at least one of: one or more grooves or one or more ridges, one or more dimples, or one or more protrusions.

4. The electrically operated aerosol-generating device according to claim 3, wherein a length extension of the one or more grooves, or a length extension of the one or more ridges, or a length extension one or more grooves and a length extension of the one or more ridges is perpendicular to a direction of the airflow passing the sound-generating member.

5. The electrically operated aerosol-generating device according to claim 3, wherein the one or more grooves, or the one or more ridges, or the one or more grooves and the one or more ridges comprise one of: a triangular shape, a sinusoid shape, or a rectangular shape.

6. The electrically operated aerosol-generating device according to claim 3, wherein at least one of a height of the one or more ridges or a depth of the grooves varies.

7. The electrically operated aerosol-generating device according to claim 6, wherein the at least one of the height of the one or more ridges or the depth of the grooves increases along the sound-generating displacement structure in a direction of the airflow passing the sound-generating member.

8. The electrically operated aerosol-generating device according to claim 2, wherein the sound-generating displacement structure comprises a periodic pattern.

9. The electrically operated aerosol-generating device according to claim 8, wherein the periodic pattern has a period length in a range between 0.1 millimeter and 2 millimeter.

10. The electrically operated aerosol-generating device according to claim 8, wherein the periodic pattern has a period length in a range between 0.25 millimeter and 0.5 millimeter.

11. The electrically operated aerosol-generating device according to claim 1, wherein the sound-generating member comprises at least one airflow-driven vibration element configured to periodically interrupt an airflow passing the at least one airflow-driven vibration element.

12. The electrically operated aerosol-generating device according to claim 11, wherein the at least one airflow-driven vibration element comprises a reed, or a lamella, or a pair of reeds, or a pair of lamellae.

13. The electrically operated aerosol-generating device according to claim 1, wherein the air path and the sound-generating member are configured such that sound generated in use of the device is in a frequency range above 15 kilo-Hertz.

14. The electrically operated aerosol-generating device according to claim 1, wherein the air path and the sound-generating member are configured such that sound generated in use of the device is in a frequency range above 40 kilo-Hertz.

15. The electrically operated aerosol-generating device according to claim 1, wherein the vibration sensor comprises a microphone, an accelerometer, a strain gauge, or piezo transducer, or a magnetic acoustic transducer.

16. The electrically operated aerosol-generating device according to claim 1, wherein the vibration sensor is disposed at a side of a wall member opposite to a side of the wall member defining at least a portion of the air path through the electrically operated aerosol-generating device.

* * * * *